Aug. 15, 1950     K. C. EDWARDS     2,518,533

REEL

Filed Oct. 18, 1945

INVENTOR
K.C. EDWARDS

BY

ATTORNEY

Patented Aug. 15, 1950

2,518,533

UNITED STATES PATENT OFFICE 2,518,533

REEL

Karl C. Edwards, Chase, Md., assignor to Western Electric Company, Incorporated, New York, N. Y., a corporation of New York Application October 18, 1945, Serial No. 623,129

10 Claims. (Cl. 242—116)

This invention relates to reels and more particularly to reels for coiling wires and the like.

In operations in which wire or the like is wound into annular coils to facilitate handling thereof, it is sometimes desirable to wind up the wire on reels, and to remove the coils from the reels so that the reels may be used to form additional coils. Reels having separable sections have been provided in the past so that the reels may be taken apart and the coils wound thereon removed. However, such reels which have been known in the past have been difficult to assemble and disassemble, have been of relatively complex construction and have been difficult to remove from driving means on which they are mounted when it is necessary to remove the entire reel from the driving means.

An object of the invention is to provide new and improved reels.

A further object of the invention is to provide reels from which coils wound thereon may be removed.

A reel forming one embodiment of the invention includes a reel section having a tapped bore therein and a second reel section complementary to the first reel section for forming a reel therewith. A threaded member secured to the second reel section may be threaded into the tapped bore in the first reel section to secure the reel sections together.

A reel forming one specific embodiment of the invention includes a pair of separable reel sections, and each of the sections is provided with a reel head and a tapered drum portion. One of the reel sections has a cylindrical projection over which the other reel section is designed to slide. A locking bolt secured to the last-mentioned reel section is designed to be threaded into a tapped bore formed in the projection in the other section to secure the two reel sections together. The reel section having the projection also is provided with a bore designed to receive a shaft for driving the reel and fits tightly over the shaft. The threads of the locking bolt and those of the tapped bore are such that the locking bolt tends to be screwed further into the bore when the reel is driven by the shaft. A jack bolt, which may be threaded through a tapped bore formed in the locking bolt, is designed to press against the end of the shaft to pull the reel mounted thereon off of the shaft when it is desired to move the entire reel from the shaft.

Figure 1:
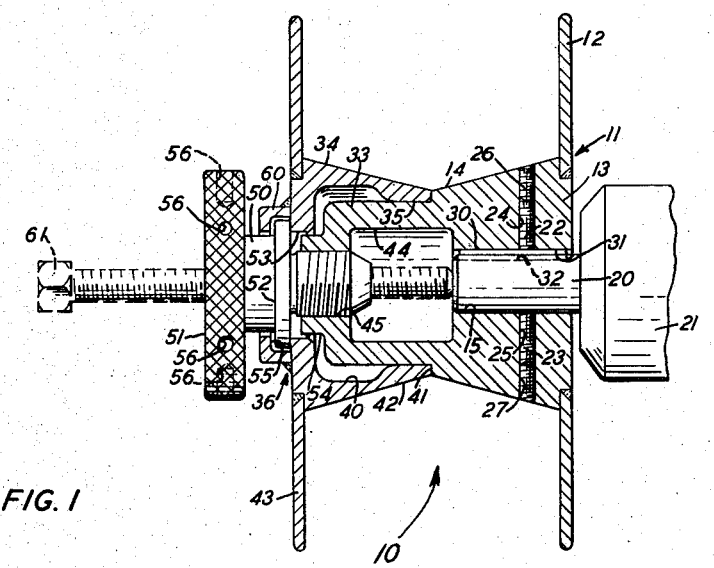
Figure 2:
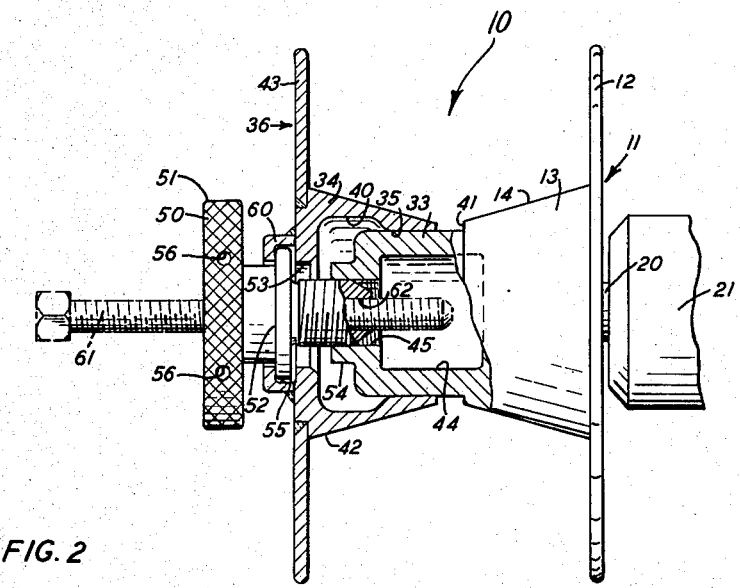

A complete understanding of the invention may be obtained from the following detailed description of a reel forming a specific embodiment thereof, when read in conjunction with the appended drawing, in which:

Fig. 1 is a fragmentary section of a reel embodying the invention mounted on a shaft, and Fig. 2 is a fragmentary, partially sectional view of the reel and the shaft.

Referring now in detail to the drawing, there is shown a split reel 10 including a reel section 11, which is provided with a reel head 12 and a drum portion 13 having a tapered periphery 14. The drum portion 13 is provided with a bore 15 which is designed to receive a shaft 20 of a gear reducer 21, driven by a suitable motor (not shown) and designed to rotate the reel. Set screws 22 and 23 threaded into tapped bores 24 and 25, respectively, formed in the reel section 11 serve to prevent longitudinal movement of the reel section 11 with respect to the shaft 20 lock screws 26 and 27 lock the set screws 22 and 23, respectively, in place. A key 30 positioned in a slot 31 formed in the reel section 11 and a slot 32 formed in the shaft 20 prevents relative rotation between the reel section 11 and the shaft.

The drum portion 13 of the reel section 11 is provided with a cylindrical projection 33, and a reel section 36 having a drum portion 34 provided with a cylindrical opening 35 is designed to slide over the cylindrical projection 33. The cylindrical projection 33 fits snugly within the cylindrical opening 35 formed in the reel section 36. The drum portion 34 is provided with a relieved portion 40, and the end of this drum portion fits tightly against shoulder 41 formed at the end of the cylindrical projection 33. The drum portion 34 also is provided with a tapered periphery 42, which tapers oppositely from the tapered periphery 14 of the drum portion 13 so that the peripheries of the drum portions 13 and 34 cooperate to form a concave drum. The reel section 36 also is provided with a reel head 43.

The drum portion 13 of the reel section 11 is provided with an enlarged passage 44 in communication with the bore 15 and a tapped bore 45 which is axially aligned with the bore 15. A locking bolt 50 having a knurled head 51 extends through a hole 53 formed in the drum portion 34 of the reel section 36 and is designed to be threaded into the tapped bore 45. The bolt 50 also has an annular collar 52 formed thereon which is secured in an annular groove 55 formed by the end of the reel section 36 and an annular cap 60 welded thereto. A boss portion 54 of the drum portion 13 is designed to enter the opening 53 formed in the drum portion 34. The knurled head 51 is provided with sockets 56—56 in which a pin (not shown) may be inserted to act as a lever arm for turning the head and thereby the bolt 50.

A jack bolt 61 may be screwed by a suitable wrench (not shown) into a tapped bore 62 formed in the bolt 50. The tapped bore 62 is aligned with the shaft 20 and the bolt 61 may be threaded into the tapped bore 62 so that the right end of the jack bolt, as viewed in Fig. 2, may be pressed against the end of the shaft 20 to draw the reel 10 from the shaft 20 after the lock screws 26 and 27 and the set screws 22 and 23 have been loosened and the reel sections 11 and 36 have been locked together by the locking bolt 50.

In the operation of the reel 10, the shaft 20 turns the sectional reel secured thereto in a clockwise direction as viewed from the left end of the reel, as viewed in the drawing. As the reel is rotated, wire is wound on the tapered peripheries 14 and 42 of the drum portions 13 and 34, respectively. As the reel is so rotated, the threads of the tapped bore 45 and the bolt 50, being left hand threads, tend to thread the locking bolt 50 farther through the bore 45 so that the drum portion 34 is held tightly against the shoulder 41 of the drum portion 13, and the locking bolt 50 may not be accidentally unscrewed from the tapped bore 45 during the take-up operation.

After the wire has been wound into a coil, the motor 21 is stopped and the locking bolt 50 is unscrewed from the tapped bore 45. As the locking bolt 50 is unscrewed, the collar 52 presses against the cap 60 and slides the reel section 36 to the left, as viewed in the drawing, relative to the reel section 11, the tapered periphery 42 of the drum section 34 permitting the drum portion 34 to be easily slid from under the coil of wire on the reel 10. The reel section 36 is removed completely from the reel section 11 and the coil of wire is slid off of the reel section 11, the tapered periphery 14 of the drum portion 13 facilitating the removal of the coil of wire.

The reel section 36 then may be slid partially over the projection 33 of the reel section 11 and the locking bolt 50 may be tightened to slide the drum portion 34 completely over the cylindrical projection and to lock the reel section 36 to the reel section 11. The operation described hereinabove then may be repeated. The locking bolt 50 may be tightened or loosened in the tapped bore 45 by inserting a pin (not shown) into one of the sockets 56—56 formed in the knurled head 51 of the locking bolt. After the reel section 36 has been locked in its proper position relative to the reel section 11, another coil of wire may be formed on the reel as described hereinabove.

If it is desired to remove the reel from the shaft 20, the screws 22, 23, 25 and 26 are loosened and the jack bolt 61 is threaded into the bore 62 formed in the locking bolt 50 to force the end of the jack bolt against the end of the shaft 20. As the jack bolt is turned further, relative to the bolt 50, the reel section 13 is pulled to the left, as viewed in Fig. 1, relative to the shaft, and is slid off of the shaft. The force exerted by the jack bolt on the shaft is directed axially of the shaft so that the shaft is not bent as the reel is disengaged therefrom. Thus, the reel section 11 may be fitted tightly upon the shaft and may be removed therefrom without damage to the shaft.

The above-described reel may be rapidly assembled and disassembled and is very simple and economical in operation and construction. It may be fitted tightly upon a shaft such as the shaft 20 and may be easily removed therefrom without damage to the shaft. Also, the tapered peripheries 14 and 42 of the drum portions 13 and 34, respectively, facilitate the separation of the reel section 36 from the reel section 11 when the reel sections have a coil of wire positioned thereon, and permit the coil of wire to be easily removed from the reel sections.

What is claimed is:

1. A reel, which comprises a reel section having a drum portion with a tapped bore therein, a second reel section complementary to the first reel section and having a drum portion adapted to telescope over the drum portion of the first reel section whereby the two drum portions form a continuous periphery over which a strand is wound, and a threaded member rotatably confined within the second reel section and designed to be threaded into the tapped bore in the first reel section to secure the reel sections together.

2. A reel, which comprises a reel section having a drum portion and also being provided with a projection extending beyond the drum portion, said projection being provided with a tapped bore, a second reel section having a drum portion designed to fit over the projection of the first reel section whereby the two drum portions form a continuous periphery over which a strand is wound, and a locking bolt retained and carried by the second reel section and designed to be threaded into the tapped bore in the first reel section to lock the reel sections together.

3. A reel, which comprises a reel section having a drum portion provided with a tapped bore therein, a bolt designed to enter the tapped bore, and a second reel section rotatably mounting and permanently carrying the bolt and designed to be interlocked with the first reel section when the bolt is threaded into the tapped bore in the first reel section.

4. A reel, which comprises a reel section having a drum portion and a projection of predetermined configuration extending from the drum portion, said projection being provided with a tapped bore, a second reel section having a hollow drum portion complementary to the projection on the first drum portion to permit the hollow drum portion to be slid over the projection, a bolt designed to be threaded into the tapped bore in the projection, a collar on the bolt, and a flange on the second reel section and overlying the collar to rotatably mount the bolt on the second reel section.

5. A reel, which comprises a reel section having a reel head, a drum portion and a cylindrical projection extending axially from the drum portion, said projection being provided with a tapped bore located axially therein, a second reel section having a reel head, a drum portion provided with a cylindrical opening for receiving the cylindrical projection of the first reel section and an annular socket formed therein, said socket being located concentrically with respect to the axis of the drum portion of the first reel section, and a bolt provided with a collar fitting rotatably in the annular socket, said bolt being designed to be screwed in the tapped bore to lock the two reel sections together.

6. A reel, which comprises a pair of separable reel sections having drum portions of approximately equal length and separable along a predetermined junction line, one of said drum portions having a horizontal projection extending from said junction line, the second drum portion having a horizontal opening telescoping over the horizontal projection of the first drum portion, the outer surfaces of said drum portions being tapered toward the junction line to form an annular groove of V-shaped cross-section, and means contained on said reel sections for interlocking the reel sections and increasing the locking action when the reel is rotated.

7. A reel, which comprises a pair of separable drum portions, and a locking bolt for securing the drum portions together, one of said drum portions being provided with a bore for receiving a shaft in close fitting engagement therewith, said locking bolt having a tapped bore extending therethrough, and a jack bolt threaded into a tapped bore and positioned in alignment with the shaft when in interlocking position so that the jack bolt may engage the end of the shaft to pull the drum sections from the shaft.

8. A reel, which comprises a reel section having a reel head, a drum portion and a cylindrical projection extending axially from the drum portion, said projection being provided with a tapped bore located axially therein, said drum portion having an opening therein for receiving a shaft, a second reel section having a reel head, a drum portion provided with a cylindrical opening for receiving the cylindrical projection of the first reel section and an annular socket formed therein, said socket being located concentrically with respect to the axes of the drum portion of the second reel section, a locking bolt provided with a collar rotatably secured in the annular socket, said locking bolt being designed to be screwed in the tapped bore to secure the two reel sections together and also being provided with a tapped bore extending therethrough, and a jack bolt designed to be screwed into the tapped bore in the locking bolt and engage the end of the shaft to pull the first reel section from the shaft.

9. A reel, which comprises a pair of separable drums, the first of said drums having a bore therein for receiving a shaft, said first drum having a tapped bore formed therein in alignment with the first-mentioned bore, a locking bolt carried by the second of said drums and threaded in said tapped bore, said locking bolt having a tapped bore formed therein, and a jack bolt threaded into the last-mentioned tapped bore and designed to engage the end of the shaft to draw the reel from the shaft.

10. A reel, which comprises a pair of separable drums having an axial bore extending partially therethrough for receiving a shaft in close fitting engagement therewith, one of said drums also being provided with a tapped bore aligned with the first-mentioned bore and a locking member carried by the other of said drums and threaded in said tapped bore, said locking member having a tapped bore formed therein and a member threaded into the last-mentioned tapped bore and designed to engage the end of the shaft to pull the reel from the shaft.

KARL C. EDWARDS.

REFERENCES CITED

The following references are of record in the file of this patent:

UNITED STATES PATENTS

| Number | Name | Date |
| --- | --- | --- |
| 550,701 | Wardwell, Jr. | Dec. 3, 1895 |
| 1,001,644 | Hutchings | Aug. 29, 1911 |
| 1,361,250 | Green | Dec. 7, 1920 |
| 1,425,895 | Prentiss | Aug. 15, 1922 |
| 1,554,412 | Coolidge | Sept. 22, 1925 |
| 1,607,888 | Hawthorne | Nov. 23, 1926 |
| 1,611,472 | Marshall | Dec. 21, 1926 |
| 2,007,705 | Brugger | July 9, 1935 |